United States Patent Office 3,697,297
Patented Oct. 10, 1972

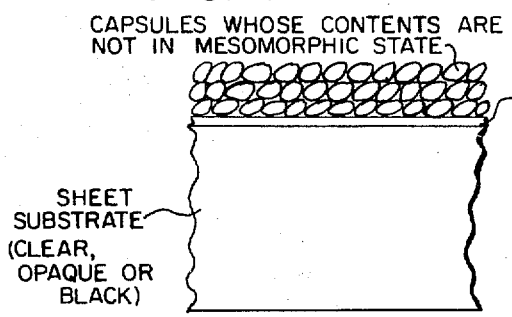
FIG. la
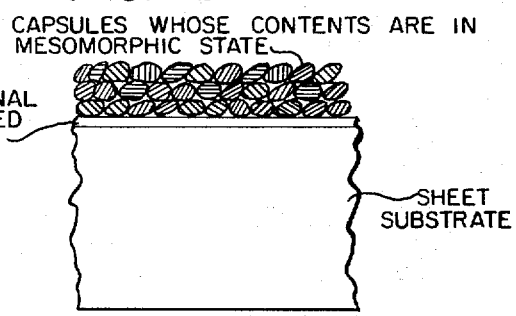
FIG. lb
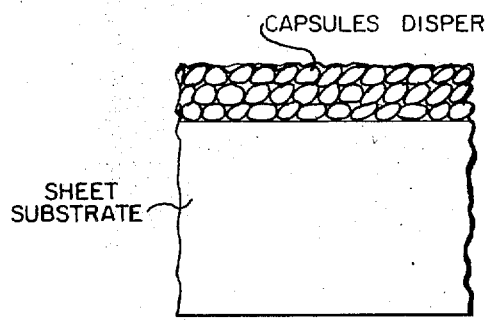
FIG. lc
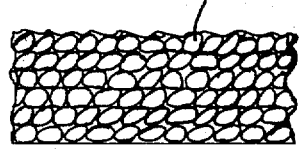
FIG. ld
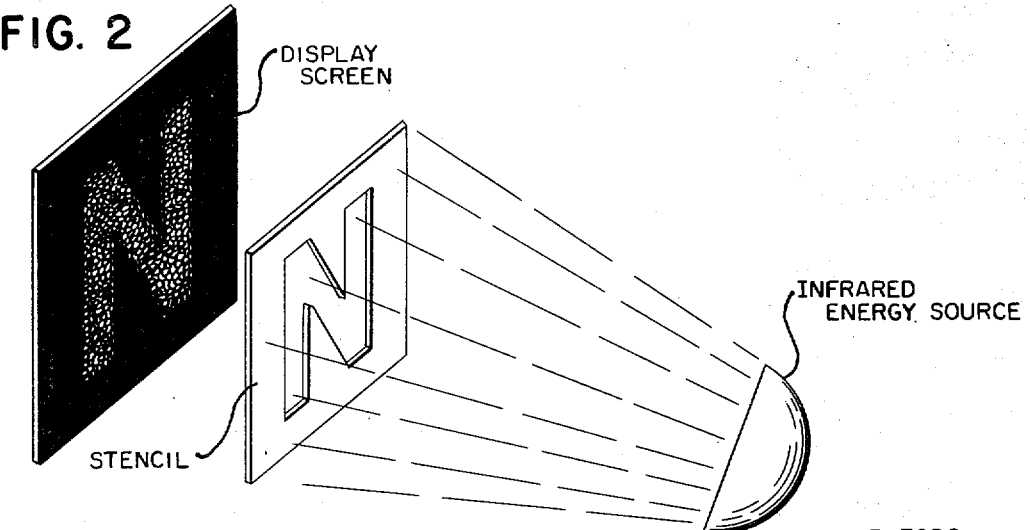
FIG. 2

3,697,297
GELATIN-GUM ARABIC CAPSULES CONTAINING CHOLESTERIC LIQUID CRYSTAL MATERIAL AND DISPERSIONS OF THE CAPSULES
Donald Churchill, James V. Cartmell, and Robert E. Miller, Dayton, Ohio, assignors to The National Cash Register Company, Dayton, Ohio
Continuation of application Ser. No. 856,891, Sept. 2, 1969, now abandoned, which is a continuation of application Ser. No. 618,751, Feb. 27, 1967, now abandoned, which in turn is a continuation-in-part of application Ser. No. 558,354, June 17, 1966, now abandoned. This application Oct. 22, 1970, Ser. No. 83,181
Int. Cl. G01k 11/16
U.S. Cl. 106—131                          4 Claims

ABSTRACT OF THE DISCLOSURE

A temperature-responsive display device or composition, comprising mesomorphic ("liquid crystal") material(s) contained in minute capsules as the temperature-responsive component, is provided. The minute capsules, when placed in heat-conductive relation with a heat source together with an associated thermal gradient pattern to be displayed, exhibit an iridescence indicative of a certain characteristic temperature range, which temperature range varies according to the types and mixtures of mesomorphic materials affords physical and chemical protection from various kinds of degradation and allows their use in practical and efficient thermal-gradient display systems.

---

This is a continuation of U.S. patent application Ser. No. 856,891, filed on Sept. 2, 1969, now abandoned, which was a continuation of Ser. No. 618,751, filed on Feb. 27, 1967, now abandoned, which was a continuation-in-part of Ser. No. 558,354, filed June 17, 1966, now abandoned.

This invention relates to temperature-sensitive display devices and, more specifically, relates to arrays of encapsulated liquid material which iridesce wherever temperature changes occur on the arrays.

The reflectance color change phenomenon associated with certain types of so-called "liquid crystals" is well known. Most important in the class of "liquid crystals" which undergo spectral color changes, iridescent in appearance, in conjunction with changes in temperature are certain cholesterol derivatives having the general structure:

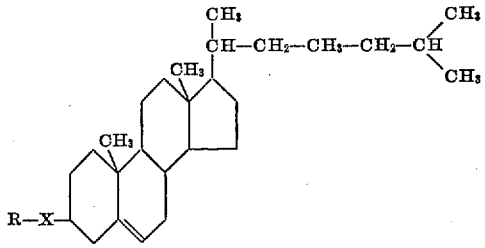

where X represents a chemical linkage selected from the group comprising ester, ether, and carbonate; and R represents a hydrocarbon "residue" selected from the group comprising saturated or unsaturated alkyls, aryls, aryl-substituted alkyls, alkyl-substituted aryls, and halo- and nitro-substituted compounds derived from the above-named R materials. Other cholesterol derivatives which may be used include those wherein X, above, represents a halogen and R is excluded from the molecular structure. Each of these compounds can exist as a molecular mass in at least three physical phase configurations dependent upon the temperature of the material. Below a certain transitional temperature associated with a particular compound (in a given environmental circumstance), the cholesterol derivatives mass as a solid crystalline phase. Above another certain transitional temperature, the compounds exist in a liquid isotropic state with no regularity in molecular arrangement. In the change from the solid crystalline phase, having highly ordered molecular arrangement, to the liquid, isotropic, phase, having irregular, unordered molecular arrangement, as a function of temperature, there exists at least one mesophase; that is to say, a phase which is intermediate between the solid state and the liquid state. While a compound which exists in the above-referred-to mesomorphic state is commonly named a "liquid crystal," the term "mesomorph" is a more correct and descriptive title and will be used hereafter. Materials which undergo change from one physical state condition to another by temperature change are termed, generally, thermotropic compounds. The cholesteric material in a mesophase is a liquid, molecularly isotropic, continuous structure in which are randomly distributed domains of aligned molecules in spaced layers adapted to reflect a probing incident light. A general discussion of mesophases and mesomorphic compounds is found in the publication "Molecular Structure and the Properties of Liquid Crystals," by G. W. Gray, published in 1962 by Academic Press, New York and London. Under proper conditions within a certain temperature range, the domains of aligned molecules in a cholesteric mesophase mass are capable of affecting a probing incident light in such a manner that the probing light is reflected in a distinctive spectral hue, usually in bands, dependent on temperature, giving, in most instances, an iridescent effect, depending the quality of the incident light.

A particularly efficient method for providing a system having this spectral or iridescent effect is the provision of thin films of mesomorphic materials which can exist as a cholesteric mesophase on a substrate which is either opaque or transparent, colored or not. For an effective visual display of the iridescence of these materials, a film of a thickness of a few thousandths of an inch can be employed, and this affords suitable contrast when supported on a black, opaque substrate. Such a substrate allows no dilution of the emanating iridescent light by reflectance from the substrate or backlighting by transmitted light, and has the added advantage of appearing black in incident light at temperatures above and below those required to yield the mesomorphic state. The usual color effect obtained from a film of cholesteric-mesomorphic material is a brilliant color pattern composed of bands or areas of spectral color ranging from red to blue. The colors are a function of temperature profile in the film, the system generally yielding relatively shorter wavelengths as the temperature rises, although exceptions have been noted in the literature in which the wavelength of emanating light lengthens as temperature is raised. Of course, above and below the temperatures necessary for visual color display, there may be reflection of ultraviolet and infrared wavelengths of greater or lesser extent, depending upon the system being studied and the quality of incident light.

With few exceptions, the systems chosen for temperature detection and display in a particular use are composed of two or more mesomorphic compounds selected and combined for the purpose of causing color change within a specified temperature range.

While mixtures of these cholesterol derivatives yield workable film systems, it is a general rule that the advant temperature of color in the use of such structures is not the advent temperature noted for each material used alone, but will generally be lower than the temperature at which the material having the highest temperature parameters first yields color, and sometimes may be lower than the color advent temperature of the material having the lowest temperature parameters.

Up to this time, the utility of cholesteric mesomorphs in temperature-sensitive systems has been severely limited due to a number of reasons, the following points being some of the assigned faults:

(1) Such systems containing a mixture of one or more intermingled mesomorphic compounds as a film are subject to crystallization of large areas at the desired working temperatures. This undesirable crystallization tends to concentrate one of the active materials at each crystallization site to thereby separate it from the other components of such a mesomorphic mixture. This component separation results in (a) loss of precision and efficiency in color change at the desired temperature, and (b) anomalous color change activity at other temperatures;

(2) Mesomorphic cholesterol derivatives are oily liquids at and above their melting temperatures. When they exist as a film on any surface, the film, being wet, is subject to injury of many types from aging and contact with the environment. Dust particles are easily entrapped by the liquid surface and can serve as undesirable nucleation sites for crystallization. Such films are exposed to the danger of contact with any material in the vicinity, with resultant disorganization of the mesomorph and possible change in thickness in localized areas, which would alter the response of the system; and (3) The subject wet-film mesomorphic systems are prone to anomalous color change behavior upon the event of only slight contamination of the system by various solutes. This contamination can cause iridescence by itself at a given temperature not otherwise associated with the advent of color in the film generally, or it can produce large shifts in the color-advent temperature, either higher or lower.

Isolation and protection of these thermotropic liquids as droplets as the cores of minute transparent-walled capsules, and the distribution of those capsules in a film-layer onto a desired eligible substrate for use as a temperature sensing device, represent the predominant substance of this invention.

Another object falling within the scope of the invention is to provide, in such a film-layer, a distribution of mixed capsules distinguished by their different content and performance, which system of mixed capsules can serve the purpose of sensing temperature or displaying data at several temperature levels.

The preferred method of preparing capsules eligible for containing mesomorphic materials has been disclosed in United States Letters Patent No. 2,800,457, issued July 23, 1957, on the application of Barrett K. Green and Lowell Schleicher. While the aforementioned capsule preparation system is preferred, it should be understood that the capsule product of this invention can be attained by any of the many later-developed encapsulation techniques which is capable of producing capsules of the required small dimensions. The final form of the capsular material to be coated is preferably ten-to-fifty-micron capsules, but it has been found that any size of capsules can be successfully utilized, the larger capsules only showing a decreased degree of visual resolution when used in a data display system. While U.S. Pat. No. 2,800,457 discloses a pioneer invention concerning the encapsulation on a minute scale, reference is also made to application for United States Letters Patent Ser. No. 591,023, filed Oct. 31, 1966, now U.S. Pat. No. 3,341,466, issued Sept. 12, 1967, which is a continuation of United States patent application Ser. No. 137,992, filed Sept. 14, 1961, by Carl Brynko et al., which discloses the technique of making larger-than-microscopic capsules. This process is also disclosed in corresponding British Pat. No. 935,812. Encapsulated mesomorphic-compound film layers appear to be free of the heretofore limiting disadvantages associated with exposed continuous wet films of the materials. Layers cast from an aqueous slurry of the encapsulated material and dried are dry to the touch (although mostly liquid), are relatively unaffected by brushing contact with foreign bodies, are substantially immune to solute contamination, and are not subject to rapid deterioration by selective nucleation crystallization; and, in cases where crystallization does begin, it is stopped from further areawise development by the boundary of a capsule wall.

Films comprising encapsulated mesomorphic materials for use in this invention can be manufactured by several methods. When the capsules are prepared according to the techniques disclosed in the above-named patents or by other techniques wherein the capsule wall material is tacky after manufacture and before drying, the capsules can be cast while tacky onto a substrate material as a slurry, with either the capsule manufacturing vehicle or other, selected, liquid as the slurrying vehicle. The capsule walls, being tacky while drying on the substrate, stick to each other and to the substrate without the use of an added binder such as polymeric film-forming material.

If desired, an added binder matrix of polymeric material can be used in manufacture of the display film, wherein capsules which contain the mesomorphic material are dispersed in a liquid solution of polymeric binder material and the resulting dispersion is cast onto a substrate material and dried to yield a coated construction of capsules embedded in a polymeric binder film. The substrate can be of any conventional sheet material, including glass, and a polymeric material of the same kind as that of the binder material or not, as desired or required by the intended purpose. Binder material useful in the practice of this invention must be translucent or substantially transparent in order for light, incident to the display films, to be transmitted therethrough to and from the mesomorphic material.

A dispersion of the encapsulated liquid crystal material in a liquid solution of film-forming binder material need not necessarily be cast permanently onto a substrate. Such a dispersion can be cast onto a support and dried, so that the resulting film of capsules embedded in binder material is strippable or otherwise separable from the support to yield a self-supporting display film having capsules more or less evenly distributed throughout.

Another feature of the incorporation of encapsulated materials into a system to provide a temperature-sensing device is the utilization of a mixture of capsules as to size and content for indicating a wide range of temperatures. Such a system, in one case, may consist of layers, each layer comprising one, two, or more types of capsules having different characteristics. These adjustments of characteristics may involve:

(a) temperature response range;
(b) size of liquid core;
(c) type and thickness of capsule wall material;
(d) kind of mesomorphic materials, and the like, all to the purpose of choosing an exact response suitable for the proposed use.

A further feature of this invention involves the use of a colored material as the wall of the mesomorph-containing capsules. Capsule walls serve, in this case, as liquid containers and also as color filters for light traveling to and from the mesomorphic materials. Capsule walls are easily tinted by the use of stains. Such a controlled system would find use in devices where the broad spectrum iridescent effect is objectionable.

Of the drawings which form a part of the specification.

FIG. 1a is a diagrammatic edge view of a substrate sheet having a coating of capsules, on a surface, with the cholesterol derivative contents not in the mesomorphic state but either in an isotropic liquid state or in a crystalline solid state. The capsules depicted have been applied from a slurry wherein the slurrying liquid is the liquid in which the capsules were manufactured or another, dryable, liquid without dissolved solid materials. The capsules in these showings are adhered together, to other capsules, and to the substrate sheet by residual capsule wall material which remained in solution in the manufacturing vehicle during encapsulation, or by the tacky capsule wall material itself.

FIG. 1b shows the sheet of FIG. 1a with the capsule contents shown to be in the mesomorph state.

The substrate can be any suitable material, thick or thin, transparent or opaque, colored or not. FIGS. 1a, 1b, and 1c, to be described, show a film thickness of material as a substrate, but the use of a material only of film thickness is optional. If it is more convenient or to the intended use, any firm body can be utilized to provide a surface for material. As an alternative method, the encapsulated, temperature-responsive materials may be utilized as a liquid slurry, the color change phenomenon remaining the same as with the dried film material. FIG. 1a is intended to represent the capsule coating at a temperature above or below that which is required for coloration of the mesomorphic material, while FIG. 1b is intended to represent the same capsule coating within the temperature range of coloration. The hatching of the capsules in FIG. 1b is used only to depict a color change and not to suggest particular colors. Capsules having an average diameter of 5 to 1,000 microns or perhaps slightly larger may be used for the coating; and one capsule layer or a number of superimposed layers can be used, depending upon conditions and requirements of the intended coating application. Different areas of the same surface may contain different kinds of capsules.

FIG. 1c is a diagrammatic edge view of a substrate sheet having a coating wherein capsules are embedded in a polymeric binder material. The capsules have been cast onto the substrate as a dispersion wherein a dryable dispersing liquid includes, in solution, a surplus of film-forming polymeric material.

FIG. 1d is a diagrammatic edge view of a self-supporting temperature-responsive display film comprising a matrix of polymeric binder material throughout which are embedded minute capsules containing mesomorphic material.

Figure 3:
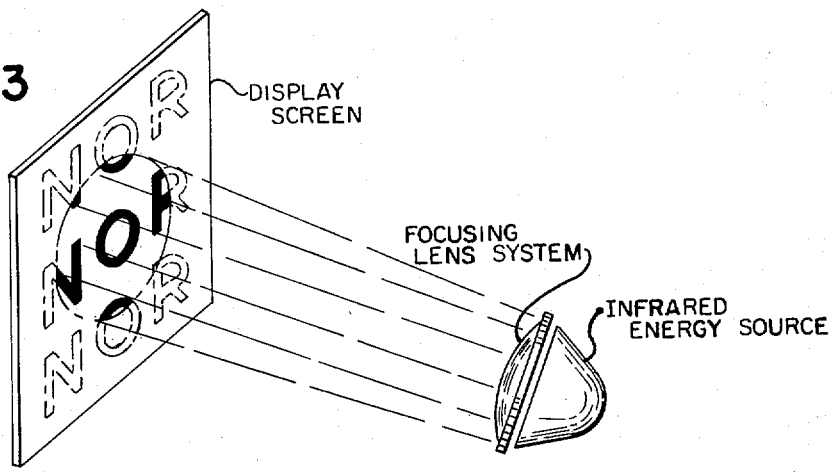

FIGS. 2 and 3 illustrate the use of a display screen comprising a coating of capsules containing but one system of thermotropic material, which has been coated onto a substrate of self-supporting material. An energy source—in this case an infrared light—is directed at the display sheet of FIG. 2 and is controlled by a stencil. Infrared rays which pass the stencil are absorbed on the display sheet and thereby raise the sheet surface temperature in such a manner as to cause a color change having an outline similar in shape to the stencil cut-out. In FIG. 3, the encapsulated material has been coated onto a display screen substrate which has the same color and texture as the unheated, encapsulated material. As infrared rays are directed in a beam through the focusing lens system provided, the capsules in the beam-image area are warmed, causing the characteristic iridescence and visual appearance of the image. Of course, it is understood that any appropriate source of energy can be used in the practice of this invention, heat lamps being shown in the figures only as a convenient means of depicting an energy source.

Figure 4A:
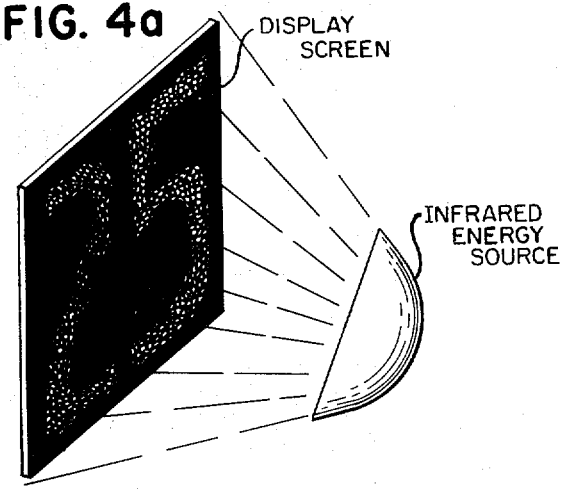
Figure 4B:
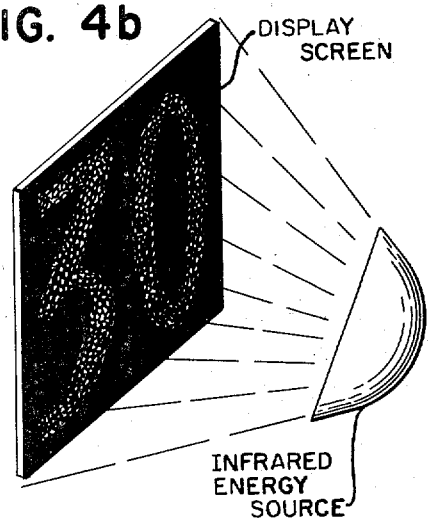

FIGS. 4a and 4b illustrate the practice of this invention as a direct-reading temperature display device employing more than one responsive system. The device has, coated on its front surface, individually responsive layers of encapsulated mesomorphic materials, each layer being applied in the outline of the numerals which represent the temperature at which the layer undergoes a color change. In FIG. 4a, the surface has absorbed infrared radiation of an amount required to bring the temperature of the capsules up to about 25 degress, the temperautre at which color change occurs in the (first) outline layer of the numerals "2" and "5." The result of this heat absorption is a visual indication of the surface temperature. In FIG. 4b, more radiation has been absorbed, and the temperature has been raised above the coloration temperature of the first kind of encapsulated material and up to the coloration temperature of a second kind of material in another layer represented by "3" and "0." The result, as shown, is disappearance of the numerals "25" and subsequent appearance of the numerals "30"—a direct temperature indication created by the selection and preparation of different areas with appropriate encapsulated mesomorphic materials.

Figure 5:
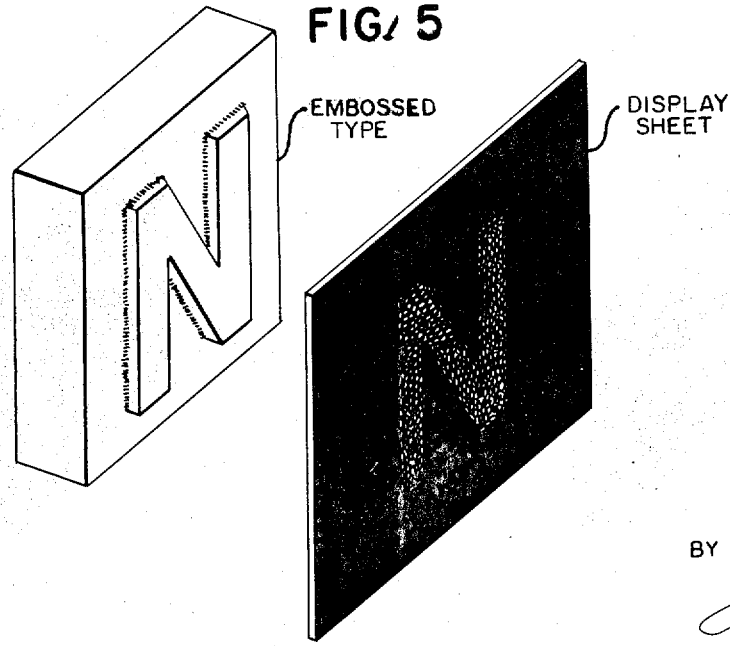

FIG. 5 illustrates a further aspect of this invention in the use of encapsulated mesomorphic materials for data display. Capsules are coated onto a display sheet, and display characters are caused to appear by contact with or proximity to a warmed character, such as an embossed type. There can be prepared, by proper selection of mesomorphic systems, sensing devices and display devices which yield their visual color advent at temperature levels considerably above or below room temperature.

Following are specific examples of an encapsulating procedure and the mesomorphic materials used for preparing capsules of the novel temperature-responsive sensing system.

EXAMPLE 1

1.25 grams of acid-extracted pigskin gelatin, having a Bloom strength of 285 to 305 grams and an isoelectric point of pH 8–9, and 1.25 grams of gum arabic were stirred with 125 grams of distilled water at 55 degrees centigrade in a Waring Blendor to yield a solution, which was at about pH 4.5. When the solution was formed, the pH was adjusted to 6.0 by the drop-by-drop addition of 20%, by weight, aqueous sodium hydroxide solution. To the above system was added a solution of 2 grams of cholesteryl propionate in 8 grams of cholesteryl oleate. The cholesterol derivative materials were emulsified in the Waring Blendor vessel to an average droplet size of 10 to 50 microns, and the pH of the system was slowly reduced by the dropwise addition of 14%, by weight, aqueous acetic acid solution. Addition of acid was continued until the single, liquid-walled, capsules clustered to form aggregates having diameters of about 25 to 100 microns. At this final state, the system pH was about 5.

The entire liquid system was then chilled with an ice bath to below 10 degrees centrigrade, while the agitation was continued. At 10 degrees centigrade, 0.6 milliliter of a 25%, by weight, aqueous solution of pentanediol, a chemical hardening agent for the gelatin, was added to the blender vessel, and the system was allowed to stir for about 12 hours while slowly returning to room temperature. At the end of that time, the capsule walls were firm and hardened, and the capsular system was poured through a wire mesh sieve having opening of 74 microns. That which passed the screen was suitable for coating the intended substrate. Capsules, along with the equilibrium liquid which passed through the sieve, were coated, using a drawdown applicator, to a wet thickness of more than 2 but less than 10 mils onto a blackened, 5 - mil - thick, polyethylene terephthalate film (sold as "Mylar" by E. I. du Pont de Nemours and Company, Incorporated, Wilmington, Del., U.S.A.) and then were dried in air at about 25 degrees centigrade. If temperature was raised at a point on the coated layer, concentric rings representing a temperature gradient pattern appeared outwardly from a central ring of blue, thence spectrally in order through red, as the temperature gradient decreased. As the temperature of the point was increased or decreased, the effect was evidenced by expansion or contraction of the rings. The system of Example 1 first exhibited the mesophase coloration transition at about 25 degrees centigrade and continued to about 25 to 30 degrees centigrade. Systems of adjacent expanding and contracting rings intersected, and the resultant color was a function of the temperature of a given area.

EXAMPLE 2

The encapsulation process of this example is identical with that of Example 1 except that a different mixture of cholesterol derivatives was employed. In this example, the mesomorphic materials were 5 grams of cholesteryl propionate and 5 grams of cholesteryl nonanoate to be substituted for the cholesteryl propionate and cholesteryl oleate used in Example 1. With regard to color change and transition temperatures, this system behaved much like the system of Example 1, the proportions being selected with the end in view of making the behavior of the system aligned with ordinary living-environment temperatures, as was also the objective of Example 1.

EXAMPLE 3

In this example, two different cholesterol derivative mixtures were separately encapsulated by the method described in Example 1, and the capsules were coated, as a mixture, onto a blackened substrate film. The mesomorphic mixtures were (a) oleyl cholesteryl carbonate and cholesteryl nonanoate in a one-to-one ratio, and (b) oleyl cholesteryl carbonate and cholesteryl nonanoate in a one-to-three ratio, respectively. Maximum response to incident light (strong in 5500-angstrom components) was at 34.5 degrees centigrade in one system (a) and at 48.8 degrees centigrade in the other system (b).

The visual effect of such a coated mixture of capsules was much the same as that of the previous examples, except that the iridescence occurred in two sequences beginning at two different temperatures. In warming a test point on the coated layer, the first sequence of concentric rings of color appeared circling the point of heat application. When the spot on the coated layer was further heated above the first color advent temperature but below the color advent temperature of the second encapsulated material, the test point again appeared black with only a ring of color remaining, at that time, a fixed distance from the center of heat source, due to the static temperature gradient. Upon further heating of the test point on the coated layer, a second set of color rings began to appear and move outwardly, but never reached the first rings, giving rise to a visual indication of the temperature at two different locations on the coated substrate. So much for point application of heat. When the coated substrate film, as a whole, was heated, the film reflected changing colors, not in rings, but all over, colors first appearing due to one encapsulated material and then, on further heating, due to the second encapsulated material, the film appearing black for a time at temperatures intermediate to the different color advent temperatures. The color changes appeared in reverse order on cooling the film. If capsules of different mesomorphic materials which have overlapping color-change temperature ranges are combined, then the reflected colors will be combined to alter the visual appearance, depending on the relation of the different responses and the resolution of the capsular system. As discussed previously, smaller capsules yield systems with higher resolution.

EXAMPLE 4

Capsules for use in this example were prepared by the technique of Example 1 and contained mixtures of oleyl cholesteryl carbonate (OCC) and cholesteryl nonanoate (CN) in proportions and having reflective characteristics using incident white light, as presented in the following table:

| Capsule type | (OCC)/(CN), by weight | Advent temperature (degrees centigrade) for maximum 5,500 angstrom reflectance | Temperature range (degrees centigrade) for 6,000-4,500 angstrom reflectance |
| --- | --- | --- | --- |
| #1 | 25/75 | 48.8 | 48.5-49.8 |
| #2 | 50/50 | 34.5 | 34.3-35.4 |
| #3 | 65.2/34.8 | 28.3 | 28.1-29.1 |

These three encapsulated materials, #1, #2, and #3, were cast (as in Example 1) onto blackened film separately but in a pattern of squares and in such a way that the individual squares overlapped to form various couplet and triplet thicknesses. When this pattern was heated, each of the three encapsulated materials demonstrated the previously described color change phenomenon, wherein one color fringe traveled across single-material squares, two fringes appeared on the doubly overlapped layers, and three such color fringes were evidenced on portions of the pattern where all three of the mesomorphic materials were present. The principal object of this example was to indicate that overlapped layers of the mesomorphic materials operate independently and that the layers are transparent to yield the dramatic iridescent effect even when overcoated with other encapsulated mesomorphic materials having different color-temperature characteristics.

EXAMPLE 5

Capsules for use in this example were prepared by the technique of Example 1 and contained a mixture of equal parts of oleyl cholesteryl carbonate and cholesteryl nonanoate, which mixture has a color advent temperature of approximately 34.5 degrees centigrade, as specified in the table in Example4. The liquid system of capsules and manufacturing vehicle was poured onto a wire mesh sieve having openings of 149 microns in size, and the material which passed through was collected in a fluted filter paper to allow excess manufacturing vehicle to drain off, thus forming a concentrated capsule slurry. One part, by weight, of the concentrated capsule slurry, having a consistency of thin paste, was dispersed in two parts by weight, of an aqueous solution of binder material prepared as follows:

Poly(vinyl alcohol) [1] _____grams__ 60
Glycerol _____do____ 10
Wetting agent [2] _____drops__ 5

[1] The poly(vinyl alcohol) used in this example was "Elvanol 71-24" as sold by E. I. du Pont de Nemours & Co., Inc., Wilmington, Del., U.S.A., and was characterized by the facts that (a) a 4%, by weight, aqueous solution of the material exhibited a viscosity of 23 to 28 centipoises at 25 degrees centigrade, and (b) the material was 97.7 to 98.4% hydrolyzed; i.e., that specified percentage of acetate or other chemical groups originally present in molecules of the subject material had been converted to hydroxyl groups.
[2] The kind of wetting agent used is not important to success of the invention and was added here merely to improve the results. The wetting agent used in this example was polyoxyethylene (20) sorbitan monooleate—"Tween 80" as sold by Atlas Chemical Company, Wilmington, Del., U.S.A.

were dissolved in 540 milliliters of water. The liquid dispersion of capsules in binder solution was then coated, using a drawdown applicator, to a wet-film thickness of 5 to 10 mils onto a polyethylene terephthalate sheet and dried in air at about 25 degrees centigrade. The resulting dry film of capsules embedded in binder material was 1 to 2 mils thick and was stripped from the sheet for use as a flexible temperature-gradient-display film. In the use of non-opaque films such as the above stripped film, care must be exercised that the film, when used, is in direct contact with the test body whose temperature pattern is to be displayed. Lack of such direct contact between film and test body results not only in the display of incorrect discontinuities of temperature pattern, but also in greatly reduced brilliance of the color reflectance due to the "return-reflection" of incident light from the back of the film surface. Of course, the capsule-containing binder film of this example could have been used as a temperature pattern display sheet before being stripped from the substrate material—the only difference residing in the different flexibilities of the sheet materials which can be selected to best serve an intended purpose. Non-opaque temperature pattern display films or translucent films for which more brilliant color response is desired can be coated with appropirate opacifying materials either black or of any selected color; or, if desired, a slight amount of pigment or dye can be added to the liquid dispersion before a film is prepared. Such an addition of coloring material, while working to partially obscure the color pattern, also serves to opacify the film and reduce tendency for the above-mentioned "return-reflection." Glycerol was included in the film of this example as a plasticizing agent to impart increased flexibility to the finished film. Of course, any of the commonly used film-plasticizing materials can be used in the amount necessary to obtain the required or desired final film characteristics. Plasticizers are not necessary to the film formulation.

EXAMPLE 6

In this example, a composite sheet of polymeric binder material was prepared—one portion or layer of said sheet being opacified, and a second layer having, in dispersion, capsules which contained liquid crystal material.

One hundred grams of aqueous binder solution as in Example 5 was mixed with ten milliliters of permanent black ink. The mixture was coated, using a drawdown applicator, onto a substrate of polyethylene terephthalate and was allowed to dry for a few hours in air at about 25 degrees centigrade.

A portion of capsule-containing binder material solution, as used in Example 5, was then applied as a second layer on the opacified first layer, and the resulting composite film was completely dried in air at about 25 degrees centigrade. The dried, flexible, composite film, when stripped from the polyethylene terephthalate substrate, was very effective in exhibiting temperature patterns and showed no "return-reflection" through the film as mentioned in Example 5.

EXAMPLE 7

This example is identical with Example 6 with the exception that pigskin gelatin having an isoelectric point of pH 8 to 9 and a Bloom strength of 285 to 305 grams was substituted for poly(vinyl alcohol) binder material in the opacified layer of the film construction described in Example 6. In color advent temperature tests and color brilliance tests, the constructions of Example 6 and Example 7 performed equally. Additionally, pigskin gelatin could have been utilized in place of poly(vinyl alcohol) as the polymeric binder material in which capsules were dispersed in any of Examples 5, 6, or 7.

EXAMPLE 8

This example is identical with Example 7 with the exception that the mixture of mesomorphic material encapsulated was 27%, by weight, cholesteryl propionate and 73%, by weight, cholestryl nonanoate, This mixture of materials was specially selected to exhibit an essentially unchanging color reflection over a broad temperature range. The film prepared int his example exhibited a yellow-green coloration from below about 20 degrees centigrade to above about 70 degrees centigrade.

EXAMPLE 9

In this example, capsules containing a mixture of 50%, by weight, cholesteryl propionate and 50%, by weight, cholesteryl nonanoate were prepared by the technique of Example 1, and then the capsule walls were dried by use of a spray-drying apparatus. One part of the resulting spray-dried, individual, liquid-crystal-containing capsules was dispersed in one part of a 10%, by weight, toluene solution of a methacrylic ester copolymeric material such as "Acryloid B-72," sold by Rohm and Haas Company, Philadelphia, Pa., U.S.A., characterized by a viscosity of 480 to 640 centipoises in a 40%, by weight, solution in toluene at 30 degrees centigrade. The liquid dispersion of capsules in toluene-binder material solution was coated with a drawdown applicator onto a polyethylene terephthalate sheet, and the toluene was evaporated in air at about 25 degrees centigrade. The resulting film exhibited the same qualitative temperature response characteristics as the films from previous examples, and the color advent temperature was observed to be about 25 degrees centigrade, with 25 to 30 degrees centigrade as the temperature range for complete spectral color change.

It will be understood that this invention is not limited by conditions or characteristics set forth in the specific embodiments of this specification, as the proportions and kinds of materials, especially the mesomorphic materials, may be changed as desired. Novelty lies in the encapsulation of mesomorphic materials into entities so small that the physio-optical characteristics of those materials with regard to color change-temperature sensing are retained while the benefits of sealing off of the temperature and light responsive materials into small units away from contact with the atmosphere are obtained.

What is claimed is:

1. A composition consisting essentially of a mass of minute individual capsules in a size range of from about 5 to about 1,000 microns each containing at least one cholesterol derivative having the structure:

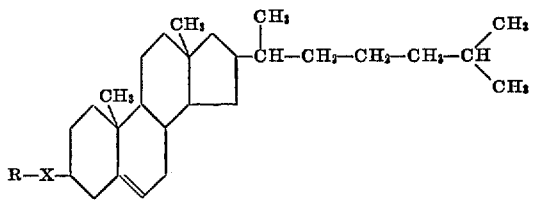

where X represents a chemical linkage selected from the group consisting of ester, ether and carbonate and R represents a hydrocarbon selected from the group consisting of saturated and unsaturated alkyls, aryls, aryl-substituted alkyls, alkyl-substituted aryls, and halo- and nitro-substituted compounds derived from the above alkyl and aryl hydrocarbons; the cholesterol derivative being retained by a capsule wall consisting essentially of light-penetrable gelatin and gum arabic, wherein said capsule wall material is capable of being penetrated by incident probing light and allowing light reflected from the capsule contents to emerge, said cholesterol derivative consisting of at least one material which, at a determined temperature and beyond, assumes a cholesteric mesomorphic state accompanied by a distinctive spectral color reflection characteristic which changes as to wavelength as a function of temperature change.

2. A composition for coating onto a surface of a body to be sensed for temperature changes, said composition being a slurry of minute capsules having walls consisting essentially of light-penetrable gelatin and gum arabic, wherein said capsules are in a size range of from about 5 to about 1,000 microns in a dryable vehicle, each capsule enclosing a droplet of cholesteric "liquid crystal material" having a structure as shown and described in claim 1 and having the property of assuming a cholesteric mesomorphic state with an accompanying display of spectral colors in incident light as its temperature changes through a critical temperature range and reverting to the non-mesomorphic state as the temperature returns through said temperature range, the capsule density of the slurry as to numbers being selected so as to form a screen surface when the composition is applied to a body surface and dried.

3. A composition consisting essentially of a mass of minute individual capsules in a size range of from about 5 to about 1,000 microns each containing at least one cholesterol derivative having the structure:

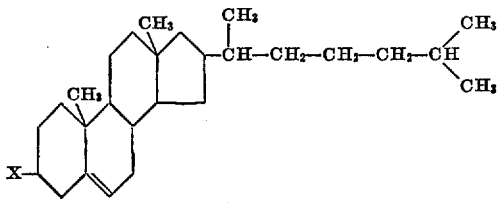

wherein X represents a halogen; the cholesterol derivative being retained by a capsule wall consisting essentially of light-penetrable gelatin and gum arabic, wherein said capsule wall material is capable of being penetrated by incident probing light and allowing light reflected from the capsule contents to emerge, said cholesterol derivative consisting of at least one material which, at a determined temperature and beyond, assumes a cholesteric mesomorphic state accompanied by a distinctive spectral color reflection characteristic which changes as to wavelength as a function of temperature change.

4. A composition for coating onto a surface of a body to be sensed for temperature changes, said composition being a slurry of minute capsules having walls consisting essentially of gelatin and gum arabic, wherein said capsules are in a size range of from about 5 to about 1,000 microns in a dryable vehicle, each capsule enclosing a droplet of cholesteric "liquid crystal material" having a structure as shown and described in claim 3 and having the property of assuming a cholesteric mesomorphic state with an accompanying display of spectral colors in incident light as its temperature changes through a critical temperature range and reverting to the non-mesomorphic state as the temperature returns through said temperature range, the capsule density of the slurry as to numbers being selected so as to form a screen surface when the composition is applied to a body surface and dried.

References Cited

UNITED STATES PATENTS

| | | | |
|---|---|---|---|
| 3,265,630 | 8/1966 | Jensen | 252—316 |
| 3,620,889 | 11/1971 | Baltzer | 23—230 LC |
| 3,627,899 | 12/1971 | Goldberg et al. | 252—408 |
| 2,800,457 | 7/1957 | Green et al. | 252—316 |
| 3,351,531 | 11/1967 | Noznick et al. | 252—316 |
| 3,390,933 | 7/1968 | Hovey et al. | 252—316 |
| 3,396,116 | 8/1968 | Adams et al. | 252—316 |
| 3,409,404 | 11/1968 | Fergason | 260—397.2 |
| 3,441,513 | 4/1969 | Woodmansee | 23—230 LC |
| 3,529,156 | 9/1970 | Fergason et al. | 252—408 |
| 3,576,761 | 4/1971 | Davis | 23—230 LC |
| 3,578,482 | 5/1971 | Whitaker et al. | 252—316 |
| 3,578,844 | 5/1971 | Churchill et al. | 252—316 |
| 3,580,864 | 5/1971 | Goldberg et al. | 252—408 |
| 3,585,381 | 6/1971 | Hodson | 252—408 |
| 3,600,060 | 8/1971 | Churchill et al. | 252—316 |
| 3,617,374 | 11/1971 | Hodson et al. | 117—212 |
| 3,619,254 | 11/1971 | Davis | 23—230 LC |

FOREIGN PATENTS

| | | | |
|---|---|---|---|
| 1,091,076 | 11/1967 | Great Britain | 252—316 |
| 1,138,590 | 1/1969 | Great Britain | 23—230 LC |
| 1,161,039 | 8/1969 | Great Britain | 23—230 LC |

OTHER REFERENCES

Chemical Abstracts, vol. 52:7617(d), 1958.

Otto Rosenheim: "A Specific Colour Reaction for Ergosterol," from the National Institute for Medical Research, Biochemistry Journal, 23, 47 (1929) at 47–53.

Chemical Abstracts, vols. 51:18037(f) and 52:7617(d), 1958.

DONALD J. ARNOLD, Primary Examiner

J. H. MILLER, Assistant Examiner

U.S. Cl. X.R.

23—230 LC; 106—135; 252—316, 408; 260—397.2